United States Patent
She et al.

(10) Patent No.: US 9,973,092 B2
(45) Date of Patent: May 15, 2018

(54) GAS TUBE-SWITCHED HIGH VOLTAGE DC POWER CONVERTER

(71) Applicant: General Electric Company, Schenectady, NY (US)

(72) Inventors: Xu She, Niskayuna, NY (US); James William Bray, Niskayuna, NY (US); Timothy John Sommerer, Niskayuna, NY (US); Rahul Chokhawala, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/136,375

(22) Filed: Apr. 22, 2016

(65) Prior Publication Data
US 2017/0310220 A1    Oct. 26, 2017

(51) Int. Cl.
H02M 3/33 (2006.01)
H02M 1/00 (2006.01)
H02M 3/335 (2006.01)

(52) U.S. Cl.
CPC .......... H02M 3/33 (2013.01); H02M 1/0061 (2013.01); H02M 3/33584 (2013.01)

(58) Field of Classification Search
CPC ...... H02M 1/0061; H02M 1/065; H02M 1/06; H02M 3/33; H02M 3/3372; H02M 3/3353; H02M 3/31; H02M 3/28; H02M 1/02; H02J 50/12
USPC ...................................... 363/21.02
See application file for complete search history.

(56) References Cited

U.S. PATENT DOCUMENTS

| | | | |
|---|---|---|---|
| 2,872,582 A | 2/1959 | Norton | |
| 2,947,913 A | 8/1960 | Trostler | |
| 3,931,564 A | 1/1976 | Mims | |
| 5,352,956 A | 10/1994 | Doss | |
| 8,378,646 B2 * | 2/2013 | Shimada | H02M 3/33507 307/66 |

(Continued)

FOREIGN PATENT DOCUMENTS

| EP | 2771898 B1 | 9/2014 |
|---|---|---|
| GB | 424 859 A | 3/1935 |

OTHER PUBLICATIONS

Urban et al., "Cold cathode thyratron development for pulsed power applications", 2002.*

(Continued)

*Primary Examiner* — Kyle J Moody
(74) *Attorney, Agent, or Firm* — Nitin N. Joshi

(57) ABSTRACT

A direct current (DC)-DC converter includes a transformer and a gas tube-switched inverter circuit. The transformer includes a primary winding and a secondary winding. The gas tube-switched inverter circuit includes first and second inverter load terminals and first and second inverter input terminals. The first and second inverter load terminals are coupled to the primary winding. The first and second inverter input terminals are couplable to a DC node. The gas tube-switched inverter circuit further includes a plurality of gas tube switches respectively coupled between the first and second inverter load terminals and the first and second inverter input terminals. The plurality of gas tube switches is configured to operate to generate an alternating current (AC) voltage at the primary winding.

21 Claims, 6 Drawing Sheets

(56) References Cited

U.S. PATENT DOCUMENTS

| | | | |
|---|---|---|---|
| 8,441,817 B2 | 5/2013 | Paeaejaervi | |
| 9,356,523 B2* | 5/2016 | Yoshida | H02M 3/33576 |
| 9,391,532 B2* | 7/2016 | Reiter | H02M 3/3376 |
| 9,520,801 B1* | 12/2016 | She | H02M 7/213 |
| 2004/0155603 A1* | 8/2004 | Clegg | H05B 41/245 |
| | | | 315/291 |
| 2009/0190383 A1* | 7/2009 | Birnbach | H02M 7/533 |
| | | | 363/120 |
| 2010/0244775 A1* | 9/2010 | Smith | H02M 3/33584 |
| | | | 320/140 |
| 2014/0265583 A1 | 9/2014 | Chaudhuri et al. | |
| 2014/0347897 A1 | 11/2014 | Broussard et al. | |
| 2015/0027775 A1 | 1/2015 | Testin et al. | |
| 2015/0098259 A1 | 4/2015 | Michael et al. | |
| 2015/0102683 A1* | 4/2015 | Bae | H02J 3/01 |
| | | | 307/104 |
| 2015/0280421 A1 | 10/2015 | Niwa et al. | |
| 2016/0020057 A1 | 1/2016 | Sommerer et al. | |
| 2016/0365803 A1* | 12/2016 | Torrico-Bascope | H02M 3/33584 |
| 2017/0033686 A1* | 2/2017 | Cadilhon | H03K 3/53 |
| 2017/0047857 A1* | 2/2017 | She | H02J 3/36 |

OTHER PUBLICATIONS

"High-Voltage, High-Power Gas Tube Technology for HVDC Transmission", GE Global Research, http://arpa-e.energy.gov/?q=slick-sheet-project/high-power-gas-tube-switches, Nov. 28, 2012, 1 page.

Extended European Search Report and Opinion issued in connection with corresponding EP Application No. 17167336.1 dated Oct. 2, 2017.

* cited by examiner

GAS TUBE-SWITCHED HIGH VOLTAGE DC POWER CONVERTER

STATEMENT REGARDING FEDERALLY SPONSORED RESEARCH & DEVELOPMENT

This invention was made with Government support under contract number DE-AR0000298 awarded by the Department of Energy. The Government has certain rights in this invention.

BACKGROUND

The field of the disclosure relates generally to high voltage direct current (HVDC) systems and, more particularly, to gas tube-switched DC power converters for HVDC systems.

Known power transmission systems utilize direct current (DC) or alternating current (AC) networks. In known AC systems, various AC networks are connected using transformers to transition between voltage levels and to provide galvanic isolation. A DC node is connected to such an AC system using transformers and AC-DC converters. Further DC nodes may be connected using DC circuit breakers between DC nodes to block fault propagation. DC nodes include, for example, and without limitation, DC loads, DC power sources, and DC grids.

Known medium voltage and low voltage DC transmission systems offer cost reductions and loss reductions over more prevalent AC transmission systems. Costs for high voltage DC (HVDC) transmission systems, e.g., exceeding 10,000 volts, remain high relative to AC alternative transmission systems. The high costs are due to the cost and quantity of DC components necessary to assemble an HVDC system. Such DC components include, for example, and without limitation, DC circuit breakers and power semiconductors. In certain components, such as DC-DC converters, for example, and without limitation, multiple medium voltage or low voltage components are connected in series to achieve the high voltage levels. The multiple series connected components introduce cumulative costs and losses.

BRIEF DESCRIPTION

In one aspect, a DC-DC converter is provided. The DC converter includes a transformer and a gas tube-switched inverter circuit. The transformer includes a primary winding and a secondary winding. The gas tube-switched inverter circuit includes first and second inverter load terminals and first and second inverter input terminals. The load terminals are coupled to the primary winding. The input terminals are couplable to a DC node. The gas tube-switched inverter circuit further includes a plurality of gas tube switches respectively coupled between the first and second inverter load terminals and the first and second inverter input terminals. The plurality of gas tube switches is configured to operate to generate an alternating current (AC) voltage at the primary winding.

In another aspect, a gas tube-switched power converter is provided. The gas tube-switched power converter includes a plurality of gas tube switches, including a first, second, third, and fourth gas tube switch. The first gas tube switch is coupled between a first input node and a first output node. The second gas tube switch is coupled between the first input node and a second output node. The third gas tube switch is coupled between a second input node and the first output node. The fourth gas tube switch is coupled between the second input node and the second output node. The gas tube-switched power converter further includes a controller coupled to each of the plurality of gas tube switches. The controller is configured to operate the plurality of gas tube switches to convert AC power to DC power.

In yet another aspect, a DC transmission system is provided. The DC transmission system includes a first DC node and a second DC node. The first DC node is operable at a first DC voltage. The second DC node is operable at a second DC voltage. The DC transmission system further includes a DC-DC converter configured to convert between the first DC voltage and the second DC voltage. The DC-DC converter includes a transformer, a gas tube-switched inverter, and a gas tube-switched rectifier. The transformer includes a primary winding and a secondary winding. The gas tube-switched inverter is coupled between the first DC node and the primary winding. The gas tube-switched rectifier is coupled between the second DC node and the secondary winding.

DRAWINGS

These and other features, aspects, and advantages of the present disclosure will become better understood when the following detailed description is read with reference to the accompanying drawings in which like characters represent like parts throughout the drawings, wherein.

Figure 1:
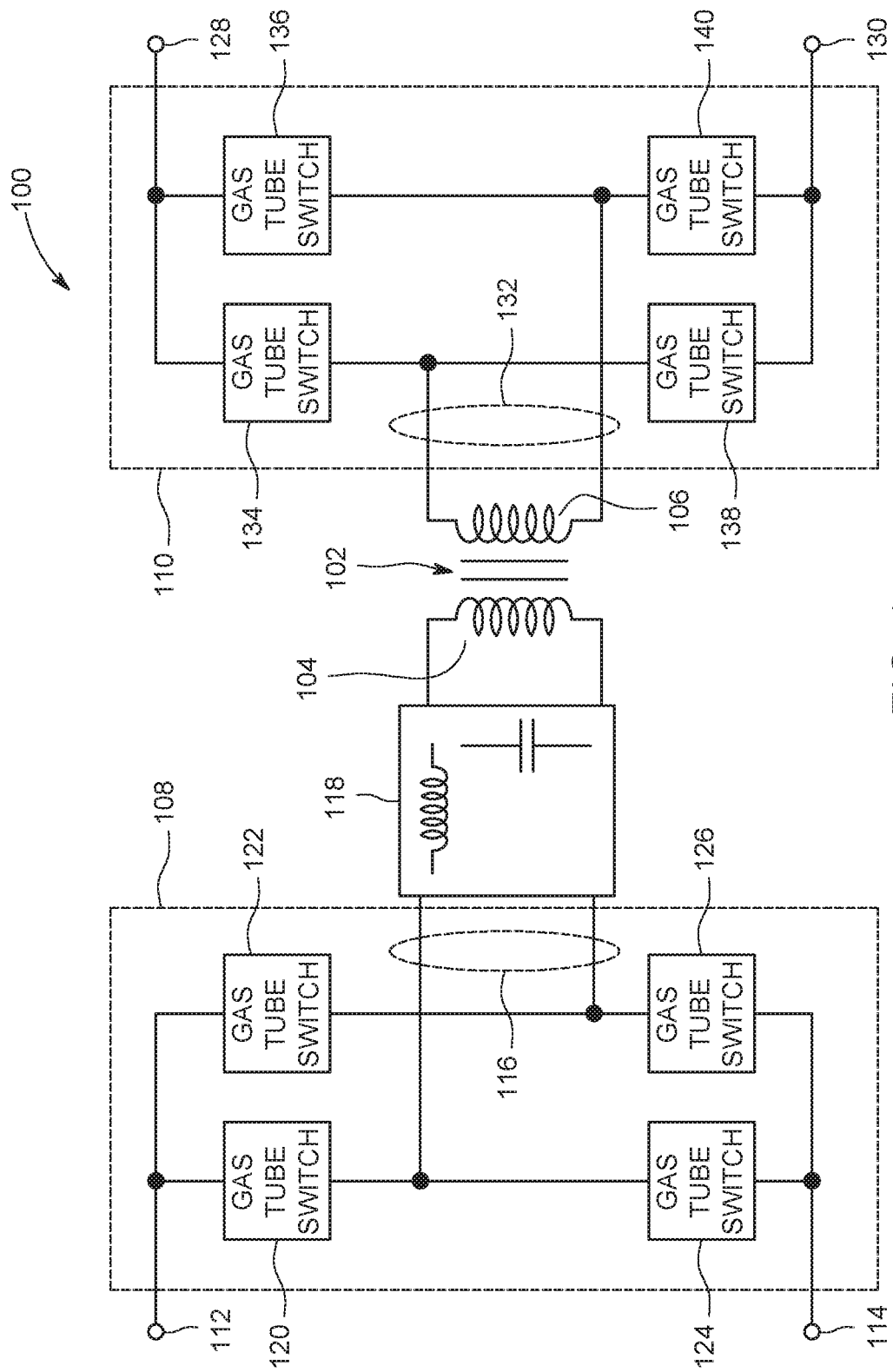
FIG. 1 is a block diagram of an exemplary DC-DC converter.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the present disclosure relate to HVDC systems and gas tube-switched DC power converters. DC power converters described herein provide bi-directional full-bridge conversion of AC and DC power. More specifically, the DC power converters described herein provide full-bridge circuits utilizing gas tube switches that have single-device voltage standoffs in excess of 10,000 volts and low forward voltage drop. DC power converters described herein facilitate high voltage DC-DC power conversion between DC nodes that operate at various HVDC levels. Such DC-DC converters further facilitate interfacing two HVDC nodes at disparate levels without need for additional protection components for isolation or stacks of numerous semiconductor switching devices to achieve necessary voltage ratings for devices and power transmission. The high voltage DC-DC converters described herein provide controllable on and off voltage source and current source operation, and bi-directional operation.

FIG. 1 is a block diagram of an exemplary DC-DC converter 100. DC-DC converter 100 includes a transformer 102 including a primary winding 104 and a secondary winding 106. DC-DC converter 100 further includes a gas tube switched-inverter circuit 108 and a gas tube-switched rectifier circuit 110.

Gas tube-switched inverter circuit 108 includes a first input terminal 112 and a second input terminal 114. Gas tube-switched inverter circuit 108 further includes a full-bridge inverter coupled between first input terminal 112 and second input terminal 114, and including a pair of load terminals 116. Load terminals 116 are coupled to primary winding 104 of transformer 102 through an impedance circuit 118. The full-bridge inverter of gas tube-switched inverter circuit 108 utilizes at least four gas tube switches 120, 122, 124, and 126. FIG. 1 illustrates gas tube-switched inverter circuit 108 implemented with four gas tube switches; however, in alternative embodiments, the full-bridge inverter of gas tube-switched inverter circuit 108 includes two or more gas tube switches "stacked" in series in place of each of gas tube switches 120, 122, 124, and 126. The stacked configuration of switches provides a greater standoff voltage rating than that of a single switch.

Impedance circuit 118 includes a reactive load that operates as a filter to facilitate further control of power conversion, including, for example, and without limitation, soft turn-on and turn-off of gas tube switches 120, 122, 124, and 126.

Gas tube switches 120, 122, 124, and 126 are operated to convert DC voltage applied across first input terminal 112 and second input terminal 114 to an AC voltage at load terminals 116. Generally, gas tube switches 120 and 126 are closed when gas tube switches 122 and 124 are open. Likewise, gas tube switches 120 and 126 are open when gas tube switches 122 and 124 are closed. For example, when a positive DC voltage is applied to first input terminal 112 and a negative DC voltage applied to second input terminal 114, gas tube switches 120, 122, 124, and 126 are alternately opened and closed to alternately apply a positive and negative voltage to load terminals 116. Gas tube switches 120, 122, 124, and 126 are operated at a particular switching frequency to achieve a desired quality of AC power at primary winding 104. For example, in certain embodiments, gas tube switches 120, 122, 124, and 126 are operated at a switching frequency between 500 and 20,000 hertz, inclusively. Gas tube switches 120 and 124 are switched alternatively such that one is open and one is close at a given time. A "dead time" is applied where gas tube switches 120 and 124 are both open for a period of time. Likewise, gas tube switches 122 and 126 are switched alternatively with dead time. In certain embodiments, gas tube switches 120, 122, 124, and 126 are operated with a phase shift between control signals in gas tube switches 120 and 122, and 124 and 126.

Gas tube-switched rectifier circuit 110 includes a first load terminal 128 and a second load terminal 130. Gas tube-switched rectifier circuit 110 further includes a full-bridge rectifier coupled between first load terminal 128 and second load terminal 130, and including a pair of input terminals 132. Input terminals 132 are coupled to secondary winding 106 of transformer 102. The full-bridge rectifier of gas tube-switched rectifier circuit 110 utilizes at least four gas tube switches 134, 136, 138, and 140. As with gas tube-switched inverter circuit 108, gas tube-switched rectifier 110 is shown in FIG. 1 implemented with four gas tube switches 134, 136, 138, 140. In alternative embodiments, the full-bridge rectifier of gas tube-switched rectifier circuit 110 includes two or more gas tube switches stacked in series in place of each of gas tube switches 134, 136, 138, and 140.

As in gas tube-switched inverter circuit 108, gas tube switches 134, 136, 138, and 140 are operated to convert AC voltage induced at secondary winding 106 to a DC voltage at first load terminal 128 and second load terminal 130. Gas tube switches 134 and 140 are open when gas tube switches 136 and 138 are closed. Likewise, gas tube switches 134 and 140 are closed when gas tube switches 136 and 138 are open. For example, when the AC voltage induced at secondary winding 106 is high, gas tube switches 134 and 140 are closed, and gas tube switches 136 and 138 are open. When the AC voltage induced at secondary winding 106 is low, gas tube switches 134 and 140 are open, and gas tube switches 136 and 138 are closed. Gas tube switches 134, 136, 138, and 140 are operated at a particular switching frequency to achieve a desired quality of DC power at first load terminal 128 and second load terminal 130.

In certain embodiments, gas tube switches 120, 122, 124, and 126 include an anti-parallel arrangement of multiple gas tube switches to facilitate bi-directional operation. In uni-directional embodiments, gas tube switches of one of gas tube-switched inverter circuit 108 and gas tube-switched rectifier circuit 110 are configured to be actively switched, while the other is passively operated, such as in a full-bridge diode circuit. For example, gas tube switches 120, 122, 124, and 126 are operated as actively controlled switches, and gas tube switches 134, 136, 138, and 140 are operated as passive switches.

In certain embodiments, gas tube-switched inverter circuit 108 is operable in either of a voltage source mode and a current source mode. Likewise, gas tube-switched rectifier circuit 110 is operable in either of the voltage source mode and the current source mode. Generally, the full-bridge circuits cannot operate in both the voltage source mode and the current source mode concurrently.

Figure 2:
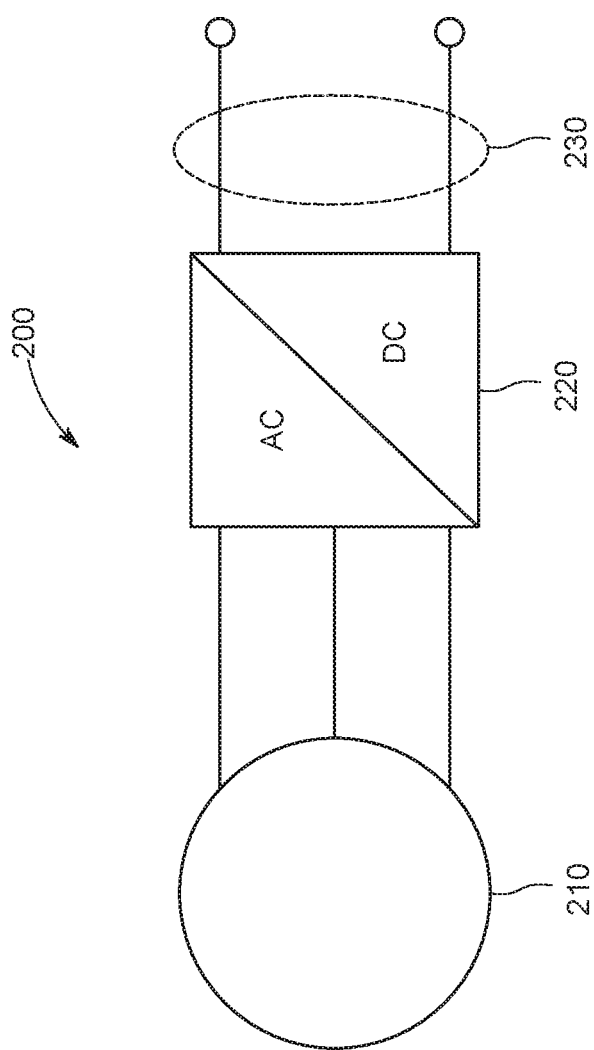
FIG. 2 is a block diagram of an exemplary DC node for use with the DC-DC converter of FIG. 1.

FIG. 2 is a block diagram of an exemplary DC node 200 for use with DC-DC converter 100 (shown in FIG. 1). DC node 200 includes a power source 210 coupled to an AC/DC converter 220. Power source 210 may include, for example, and without limitation, an AC generator, an AC grid, or a renewable AC power source, such as a wind generator. AC/DC converter 220 converts AC power provided by power source 210 to DC power for connection to a DC network or DC-DC converter 100 at node interface 230.

Figure 3:
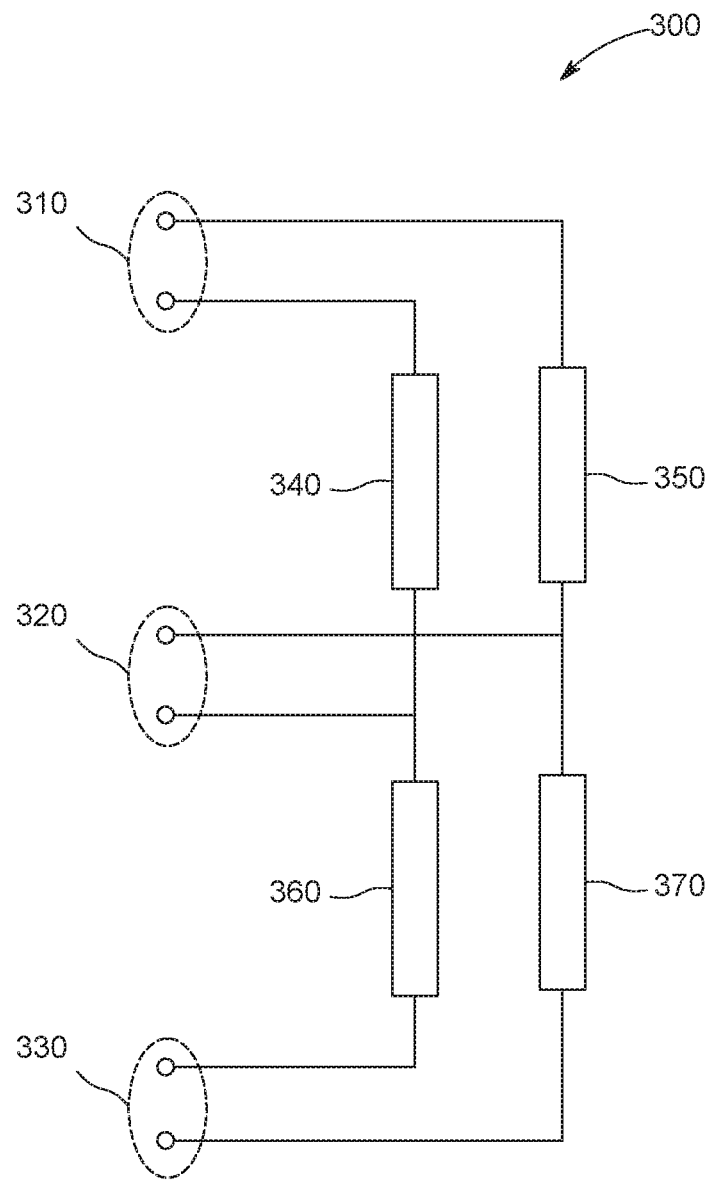
FIG. 3 is a block diagram of another exemplary DC node for use with the DC-DC converter of FIG. 1.

FIG. 3 is a block diagram of an exemplary DC node 300 for use with DC-DC converter 100 (shown in FIG. 1). DC node 300 includes node interfaces 310, 320, and 330. Each of node interfaces 310, 320, and 330 may be coupled to DC-DC converter 100. DC node 300 further includes transmission lines 340, 350, 360, and 370, which are represented as transmission line impedances. DC node 300 is an example of a DC transmission system for use with DC-DC converter 100.

Figure 4:
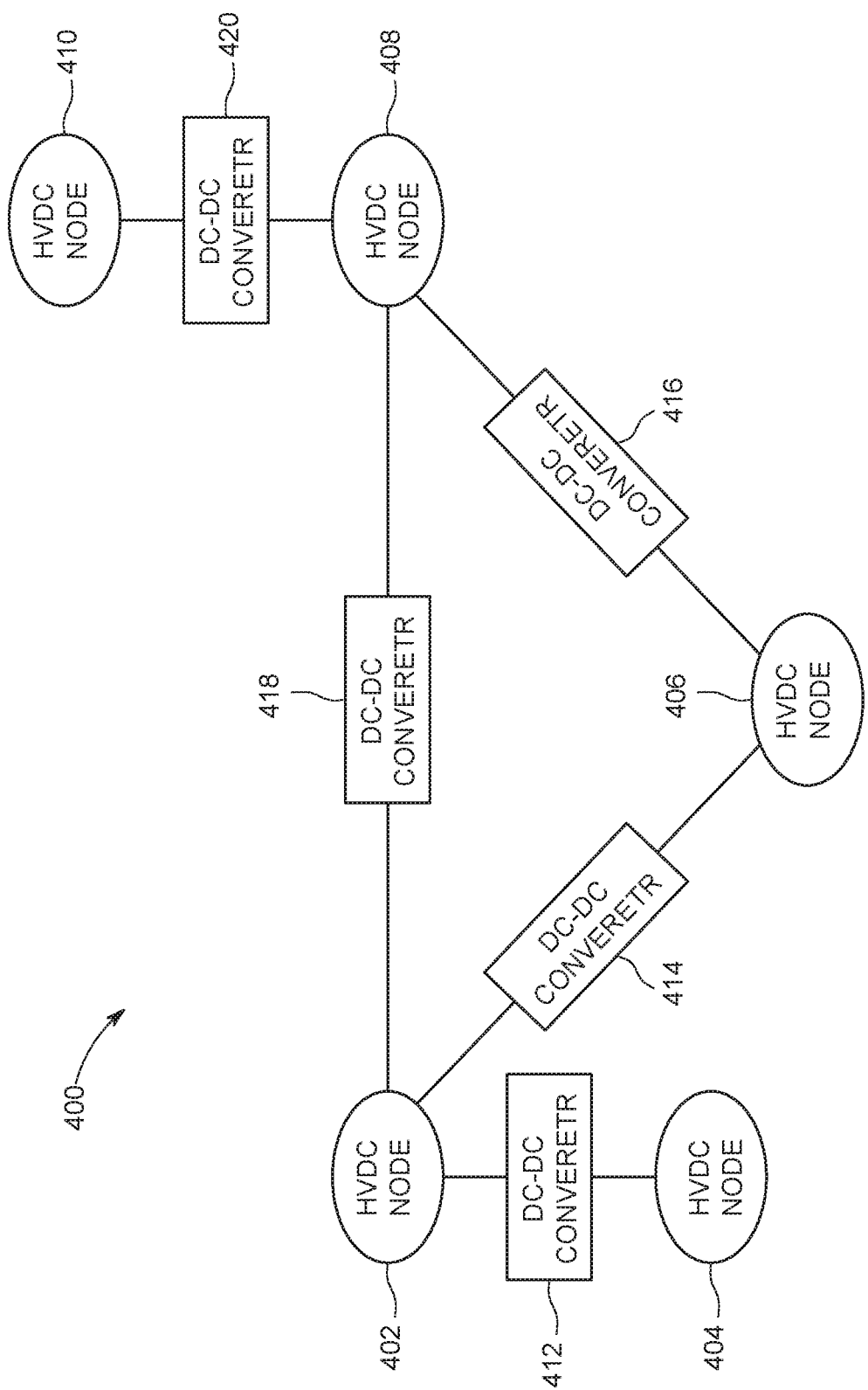
FIG. 4 is a block diagram of an exemplary DC system for use with the DC-DC converter of FIG. 1.

FIG. 4 is a block diagram of an exemplary DC system 400. DC system 400 includes a network of HVDC nodes 402, 404, 406, 408, and 410 coupled together through gas tube-switched DC-DC converters 412, 414, 416, 418, and 420. HVDC nodes 402, 404, 406, 408, and 410 include, for example, and without limitation, power sources such as DC node 200 (shown in FIG. 2), transmission systems such as DC node 300 (shown in FIG. 3), and various AC and DC loads. Each of HVDC nodes 402, 404, 406, 408, and 410 may operate at varying DC voltage levels. Gas tube-switched DC-DC converters 412, 414, 416, 418, and 420 include, for example, and without limitation, a DC-DC converter such as DC-DC converter 100 (shown in FIG. 1), that interfaces between the various HVDC levels among HVDC nodes 402, 404, 406, 408, and 410.

Figure 5:
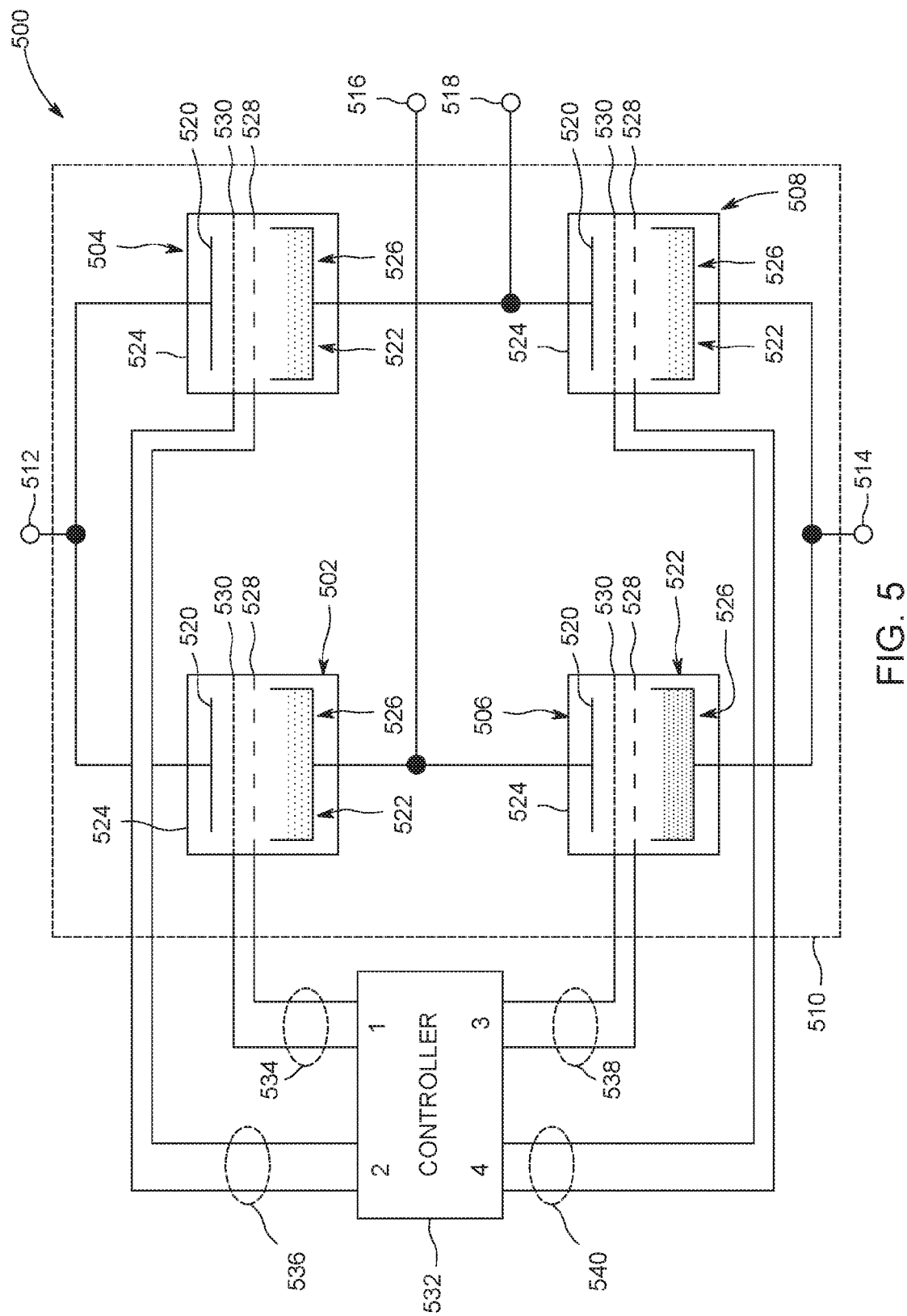
FIG. 5 is a schematic diagram of an exemplary gas tube-switched converter circuit for use in the DC-DC converter of FIG. 1.

FIG. 5 is a schematic diagram of an exemplary gas tube-switched power converter circuit 500 for use in DC-DC converter 100 (shown in FIG. 1). Power converter circuit 500 includes four gas tube switches 502, 504, 506, and 508 arranged in a full-bridge circuit 510. Full-bridge circuit 510 includes four terminals 512, 514, 516, and 518. In certain embodiments, full-bridge circuit 510 is bi-directionally operable in that a DC voltage applied across terminals 512 and 514 produces an AC voltage across terminals 516 and 518, and an AC voltage applied across terminals 516 and 518 produces a DC voltage across terminals 512 and 514.

In alternative embodiments, each of gas tube switches 502, 504, 506, and 508 is replaced by two or more gas tube switches coupled in series, or "stacked." Such a stacked configuration provides a higher standoff voltage than that of a single gas tube switch. For example, if a single gas tube switch has a standoff voltage of 100,000 volts, a stack of three such gas tube switches yields a combined standoff voltage of 300,000 volts. Likewise, if the single gas tube switch has a forward voltage drop of 100 volts, the stack of three has a combined forward voltage drop of 300 volts.

Gas tube switches 502, 504, 506, and 508, in one embodiment, are implemented as cold cathode switching devices, such as those described in U.S. patent application Ser. No. 14/776,758, and published as U.S. Patent Application Publication No. 2016/0020057, which is hereby incorporated by reference in its entirety.

Each of gas tube switches 502, 504, 506, and 508 includes an anode 520 opposed to a cathode 522. Anode 520 and cathode 522 are located within a chamber 524 and separated by a discharge gap. Chamber 524 further contains an ionizable gas 526 that occupies the discharge gap. When the switch is closed, ionizable gas 526 is ionized producing a conductive plasma extending from anode 520 to cathode 522. Each of gas tube switches 502, 504, 506, and 508 includes a keep-alive electrode 528 that helps maintain the conductive plasma. Maintaining the conductive plasma results in some loss, which is referred to as a forward voltage drop. When the switch is open, ionizable gas 526, which is non-conductive, insulates anode 520 and switching electrode 530, which is characterized by a standoff voltage. The standoff voltage is a function of various design parameters of the switch, including, for example, and without limitation, electrode materials, electrode geometry, discharge gap geometry, properties of ionizable gas 526, pressure within chamber 524, and operating temperature of the switch. Standoff voltages for gas tube switches 502, 504, 506, and 508, range from 10,000 volts to 300,000 volts inclusively, for example, and without limitation. In alternative embodiments, standoff voltages for gas tube switches 502, 504, 506, and 508 may exceed 300,000 volts.

For each of gas tube switches 502, 504, 506, and 508, when commutating, the electric field between anode 520 and cathode 522 is controlled using keep-alive electrode 528 and switching electrode 530. Keep-alive electrode 528 is optionally used to maintain a weak plasma between keep-alive electrode 528 and cathode 522 when the gas tube switch is open, improving repeatability of the closing process and reducing jitter-time. When closing, switching electrode 530 is energized to initialize the ionization of ionizable gas 526 between anode 520 and switching electrode 530 to produce the conductive plasma extending from anode 520 to cathode 522. When opening, switching electrode 530 is energized to briefly intercept the current of the conductive plasma, facilitating opening of the switch.

Keep-alive electrode 528 and switching electrode 530 for gas tube switch 502 are controlled by a controller 532 using control lines 534. Keep-alive electrodes 528 and switching electrodes 530 for gas tube switch 504, 506, and 508 likewise are controlled by controller 532 using control lines 536, 538, and 540, respectively. In certain embodiments, control lines 534 and 536 are referenced to terminal 516 and 518 respectively, and control lines 538 and 540 are referenced to terminal 514. Controller 532 is configured to operate gas tube switches 502, 504, 506, and 508 to convert DC power to AC power, or vice-versa. For example, gas tube switches 502 and 508 are closed while gas tube switches 504 and 506 are open. Further, gas tube switches 502 and 508 are open while gas tube switches 504 and 506 are closed. Controller 532 alternately opens and closes gas tube switches 502 and 508, and 504 and 506 to affect conversion, i.e., inversion, of DC voltage applied to terminals 512 and 514 to an AC voltage at terminals 516 and 518. Likewise, controller 532 alternately opens and closes gas tube switches 502 and 508, and 504 and 506 to affect conversion, i.e., rectification, of an AC voltage at terminals 516 and 518 to a DC voltage at terminals 512 and 514.

Controller 532 operates gas tube switches 502, 504, 506, and 508 at a switching frequency. The switching frequency, in hertz, quantifies a number of commutations of each of gas tube switches 502, 504, 506, and 508 per second. Gas tube switches 502, 504, 506, and 508 commutate by a single transition from open to close or from close to open. Controller 532 operates at a switching frequency between 500 and 20,000 hertz, inclusively. The switching frequency at which controller 532 operates is further determined as a function of the device or components coupled to terminals 512, 514, 516, and 518. For example, gas tube-switched DC-DC converter 100 (shown in FIG. 1) includes a transformer 102 coupled between two full-bridge circuits 108 and 110, such as full-bridge circuit 510. A determination of switching frequency for gas tube-switched DC-DC converter 100 is a function of at least the core material of transformer 102.

Figure 6:
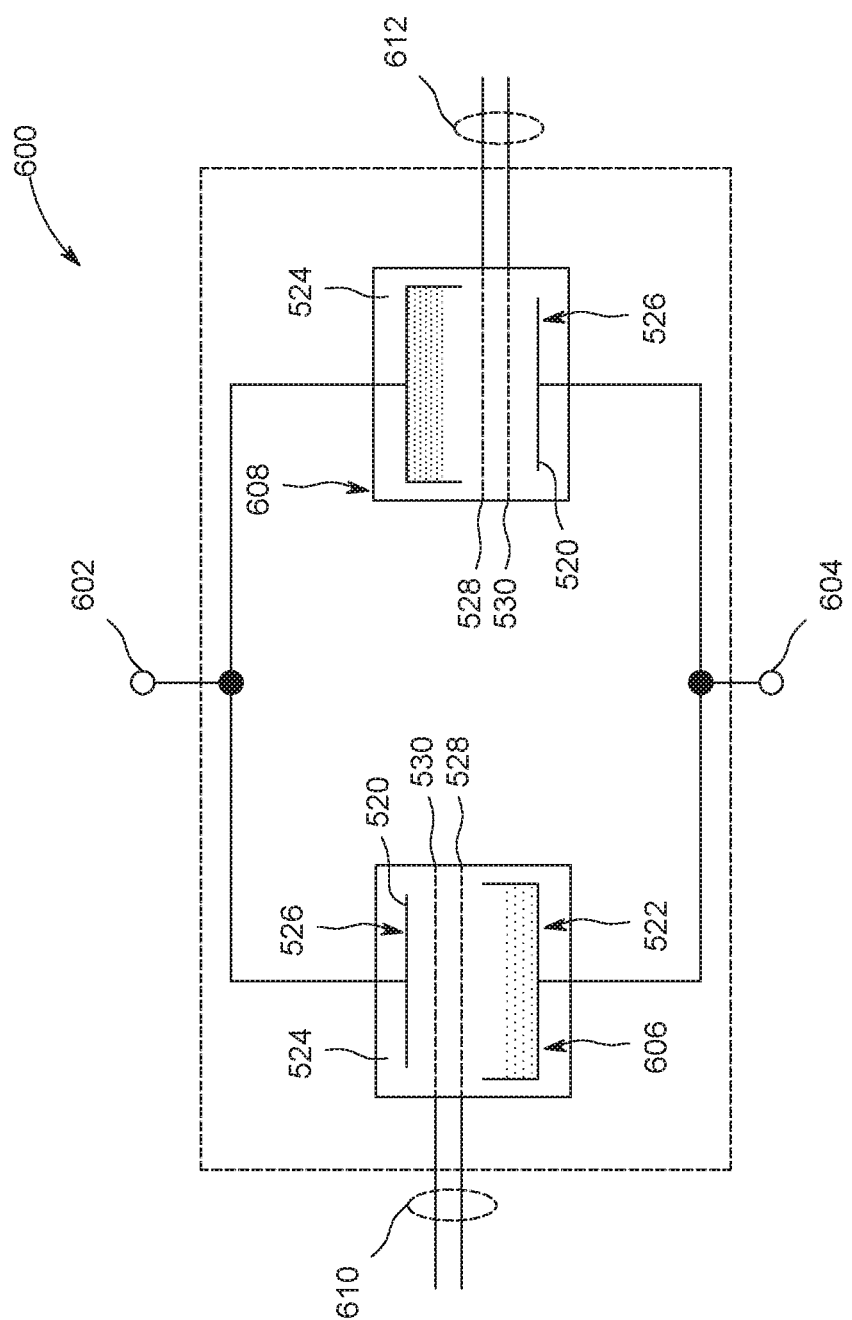
FIG. 6 is a schematic diagram of an exemplary bi-directional gas tube switch for use in the DC-DC converter of FIG. 1.

FIG. 6 is a schematic diagram of an exemplary bi-directional gas tube switch 600 for use in DC-DC converter 100 (shown in FIG. 1). Bi-directional gas tube switch 600 includes a first terminal 602 and a second terminal 604. Two gas tube switches 606 and 608 are coupled between first terminal 602 and second terminal 604 in an anti-parallel arrangement. Each of gas tube switches 606 and 608, as shown with respect to gas tube switches 502, 504, 506, and 508 in FIG. 5, includes anode 520 and cathode 522 disposed in a chamber 524 and separated by a gap. Chamber 524 is filled with ionizable gas 526. Gas tube switches 606 and 608 are controlled using control lines 610 and 612 to energize keep-alive electrode 528 and switching electrode 530 to achieve bi-directional operation. In certain embodiments, control lines 612 are referenced to first terminal 602, and control lines 610 are referenced to second terminal 604.

The above described DC power converters provide bi-directional full-bridge conversion of AC and DC power. More specifically, the DC power converters described herein provide full-bridge circuits utilizing gas tube switches that have single-device voltage standoffs in excess of 10,000 volts and low forward voltage drop. DC power converters described herein facilitate high voltage DC-DC power conversion between DC nodes that operate at various HVDC levels. Such DC-DC converters further facilitate interfacing two HVDC nodes at disparate levels without need for additional protection components for isolation or stacks of numerous semiconductor switching devices to achieve necessary voltage ratings for devices and power transmission. The high voltage DC-DC converters described herein provide controllable on and off voltage source and current source operation, and bi-directional operation.

An exemplary technical effect of the methods, systems, and apparatus described herein includes at least one of: (a) increasing single-device standoff voltage ratings; (b) reducing complexity of HVDC power converters by using fewer switching devices to achieve desired standoff voltage ratings; (c) reducing forward voltage losses through use of conductive plasmas; (d) eliminating components required to interface between HVDC systems operating at disparate HVDC levels; and (e) reducing costs of HVDC transmission systems through reduced complexity and component count.

Exemplary embodiments of methods, systems, and apparatus for DC circuit breakers are not limited to the specific embodiments described herein, but rather, components of systems and/or steps of the methods may be utilized independently and separately from other components and/or steps described herein. For example, the methods may also be used in combination with other non-conventional HVDC power converters, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A direct current (DC)-DC converter, comprising:
   a transformer comprising a primary winding and a secondary winding; and
   a gas tube-switched inverter circuit comprising:
      a first inverter load terminal and a second inverter load terminal, each of said first inverter load terminal and said second inverter load terminal coupled to said primary winding;
      a first inverter input terminal and a second inverter input terminal, each of said first inverter input terminal and said second inverter input terminal couplable to a first DC node; and
      a first plurality of gas tube switches respectively coupled between said first and second inverter load terminals and said first and second inverter input terminals, said first plurality of gas tube switches configured to operate to generate an alternating current (AC) voltage at said primary winding;
      wherein each of said first plurality of gas tube switches includes an anode and a cathode located within a chamber and separated by a discharge gap and wherein the chamber further contains an ionizable gas that occupies the discharge gap.
2. The DC-DC converter in accordance with claim 1 further comprising a gas tube-switched rectifier circuit comprising:

first and second rectifier input terminals coupled to said secondary winding;

first and second rectifier load terminals couplable to a second DC node; and a second plurality of gas tube switches respectively coupled between said first and second rectifier input terminals and said first and second rectifier load terminals, said second plurality of gas tube switches configured to operate to generate a DC voltage at said first and second rectifier load terminals.

3. The DC-DC converter in accordance with claim 2 further comprising an impedance circuit coupled between said first and second inverter load terminals and said primary winding, said impedance circuit configured to impedance-match the second DC node.

4. The DC-DC converter in accordance with claim 1, wherein said first plurality of gas tube switches comprises:

a first gas tube switch coupled between said first inverter input terminal and said first inverter load terminal;

a second gas tube switch coupled between said first inverter input terminal and said second inverter load terminal;

a third gas tube switch coupled between said second inverter input terminal and said first inverter load terminal; and a fourth gas tube switch coupled between said second inverter input terminal and said second inverter load terminal.

5. The DC-DC converter in accordance with claim 4, wherein said first gas tube switch and said fourth gas tube switch are configured to open and close together.

6. The DC-DC converter in accordance with claim 1, wherein said first plurality of gas tube switches are each operable at voltages exceeding 10,000 volts DC.

7. The DC-DC converter in accordance with claim 1 further comprising a controller coupled to said first plurality of gas tube switches, said controller configured to control operation of said plurality of gas tube switches at a switching frequency.

8. The DC-DC converter in accordance with claim 7, wherein said controller is configured to operate said first plurality of gas tube switches at the switching frequency between 500 hertz and 20,000 hertz, inclusively.

9. The DC-DC converter in accordance with claim 1, wherein each of said first plurality of gas tube switches includes a keepalive electrode and a switching electrode which control an electric field between the anode and the cathode.

10. A gas tube-switched power converter, comprising:

a plurality of gas tube switches, comprising:

a first gas tube switch coupled between a first input node and a first output node;

a second gas tube switch coupled between said first input node and a second output node;

a third gas tube switch coupled between a second input node and said first output node; and a fourth gas tube switch coupled between said second input node and said second output node; and a controller coupled to each gas tube switch of said plurality of gas tube switches, said controller configured to operate said plurality of gas tube switches to convert alternating current (AC) power to direct current (DC) power;

wherein each of said plurality of gas tube switches includes an anode and a cathode located within a chamber and separated by a discharge gap and wherein the chamber further contains an ionizable gas that occupies the discharge gap.

11. The gas tube-switched power converter in accordance with claim 10, wherein said controller is further configured to:

open said first gas tube switch and complimentarily close said third gas tube switch; and open said second gas tube switch and complimentarily close said fourth gas tube switch.

12. The gas tube-switched power converter in accordance with claim 10, wherein said controller is further configured to transmit respective switching signals to said plurality of gas tube switches to control opening of said each gas tube switch.

13. The gas tube-switched power converter in accordance with claim 10, wherein said controller is further configured to transmit respective keep-alive signals to said plurality of gas tube switches to control closing of said each gas tube switch.

14. The gas tube-switched power converter in accordance with claim 10, wherein said plurality of gas tube switches comprises a plurality of cold-cathode switching devices.

15. The gas tube-switched power converter in accordance with claim 10, wherein said controller is further configured to operate said plurality of gas tube switches to bi-directionally convert AC power to DC power and DC power to AC power.

16. A direct current (DC) system, comprising:

a first DC node operable at a first DC voltage;

a second DC node operable at a second DC voltage;

a third DC node operable at a third DC voltage; and a plurality of DC-DC converters to couple the first DC node with the second DC node, the second DC node with the third DC node and the third DC node with the first DC node, each of the said plurality of DC-DC converters comprise:

a transformer comprising a primary winding and a secondary winding;

a gas tube-switched inverter coupled between said first DC node and said primary winding; and a gas tube-switched rectifier coupled between said second DC node and said secondary winding.

17. The DC system in accordance with claim 16, wherein said first DC node is operable in a range of 10 kilovolt to 300 kilovolt, inclusively.

18. The DC system in accordance with claim 16, wherein said gas tube-switched inverter comprises:

a first plurality of gas tube switches, including:

a first gas tube switch coupled between said first DC node and a first terminal of said primary winding;

a second gas tube switch coupled between said first DC node and a second terminal of said primary winding;

a third gas tube switch coupled between said first DC node and said first terminal of said primary winding; and a fourth gas tube switch coupled between said first DC node and said second terminal of said primary winding; and a controller coupled to each gas tube switch of said first plurality of gas tube switches, said controller configured to operate said first plurality of gas tube switches to convert the first DC voltage to an alternating current (AC) voltage at said primary winding.

19. The DC system in accordance with claim 18, wherein each of said first plurality of gas tube switches has a standoff rating of at least 100 kilovolt.

20. The DC system in accordance with claim 18, wherein said controller is configured to operate said first plurality of gas tube switches at a switching frequency of 2,000 hertz.

21. The DC system in accordance with claim 18, wherein said gas tube-switched inverter further comprises a second plurality of gas tube switches respectively coupled in series with the first plurality of gas tube switches.

* * * * *